United States Patent
Kale et al.

(12)

(10) Patent No.: US 10,843,905 B2
(45) Date of Patent: Nov. 24, 2020

(54) SYSTEMS AND METHODS FOR SLUNG LOAD STABILIZATION

(71) Applicant: Summation Labs, LLC, Denver, CO (US)

(72) Inventors: Christopher Branden Kale, Englewood, CO (US); James Cornelius Maroney, Golden, CO (US); Adam Joseph Sanchez, Denver, CO (US)

(73) Assignee: Summation Labs, LLC, Denver, CO (US)

(*) Notice: Subject to any disclaimer, the term of this patent is extended or adjusted under 35 U.S.C. 154(b) by 253 days.

(21) Appl. No.: 15/940,368

(22) Filed: Mar. 29, 2018

(65) Prior Publication Data
US 2018/0282130 A1    Oct. 4, 2018

Related U.S. Application Data (60) Provisional application No. 62/481,456, filed on Apr. 4, 2017.

(51) Int. Cl.
| | |
|---|---|
| *B66C 13/30* | (2006.01) |
| *B64D 1/22* | (2006.01) |
| *B66C 13/06* | (2006.01) |
| *B66C 9/14* | (2006.01) |
| *B66C 7/08* | (2006.01) |
| *B64C 27/04* | (2006.01) |

(52) U.S. Cl.
CPC .............. *B66C 13/30* (2013.01); *B64D 1/22* (2013.01); *B66C 7/08* (2013.01); *B66C 9/14* (2013.01); *B66C 13/063* (2013.01); *B64C 27/04* (2013.01); *B66C 2700/082* (2013.01); *B66D 2700/025* (2013.01)

(58) Field of Classification Search
CPC .......... B66C 13/063; B66C 13/30; B64D 1/22
See application file for complete search history.

(56) References Cited

U.S. PATENT DOCUMENTS

| | | | | |
|---|---|---|---|---|
| 2,806,610 | A * | 9/1957 | Goertz ................. | B66C 13/063 |
| | | | | 212/273 |
| 5,491,549 | A * | 2/1996 | Wichner ............... | B66C 13/063 |
| | | | | 356/141.2 |
| 5,495,955 | A * | 3/1996 | Shibata ................ | B66C 13/063 |
| | | | | 212/275 |
| 5,967,347 | A * | 10/1999 | Miyata ................. | B66C 13/063 |
| | | | | 212/275 |
| 8,590,841 | B1 * | 11/2013 | Hall ......................... | B64C 1/22 |
| | | | | 244/137.1 |

* cited by examiner

*Primary Examiner* — Michael R Mansen
*Assistant Examiner* — Juan J Campos, Jr.
(74) *Attorney, Agent, or Firm* — Polsinelli PC (57) ABSTRACT

A hoist support system includes a rail assembly having a rail along which a motor assembly is translatable by actuation of a motor of the motor assembly. The motor assembly is adapted to support a hoist and is communicatively coupled to a control system. The control system is adapted to measure motion of a slung load coupled to the hoist and to determine whether and to what extent the slung load is swinging or otherwise unstable. In response to such measurements, the control system transmits control signals to the motor of the motor assembly to change the position of the motor assembly along the rail and attenuate the motion of the slung load.

19 Claims, 10 Drawing Sheets

SYSTEMS AND METHODS FOR SLUNG LOAD STABILIZATION

CROSS-REFERENCE TO RELATED APPLICATIONS

This application is related to and claims priority to U.S. Provisional Application No. 62/481,456 entitled "SYSTEMS AND METHODS FOR SLUNG LOAD STABILIZATION" filed on Apr. 4, 2017, the entire contents of which is incorporated herein by reference for all purposes.

TECHNICAL FIELD

Aspects of the present disclosure involve aerial vehicle hoist systems, and more particularly to a rail-mounted hoist system configured to attenuate movement of a slung load.

BACKGROUND

Helicopters, such as the UH-60 Black Hawk, are extremely versatile aircraft with numerous uses including combat and search and rescue (SAR) missions. One of the features that make certain helicopters so versatile is the inclusion of one or more hard point mounting systems configured to support a wide range of payloads. For example, certain Black Hawks may include an External Stores Support System (ESSS). The ESSS is essentially a collection of hard points within the body of the vehicle, which are reinforced to facilitate mounting different attachments, such as fuel tanks, weaponry, or other utilities. The ESSS hard points also allow for temporary attachments to be quickly taken on or off the vehicle such that the vehicle can be readily modified for particular missions. The ESSS enables many different attachments can be mounted to the vehicle without any changes to the mounting system itself. In other words, it creates a standard mounting system that allows for utilities to be developed and created for the vehicle without requiring modification of the vehicle itself to accommodate such utilities.

Hoist systems are commonly used with helicopters, such as the Black Hawk. Such systems generally include a hoist capable of extending and retracting a cable below the helicopter such that loads may be coupled to the cable and carried below the helicopter. While convenient and versatile, such "slung load" configurations can be unstable, resulting in significant swinging of the load during flight. Such swinging adds significant complexity to a flight mission and may result in increased time and cost to complete a given flight mission. In certain extreme scenarios, the instability of slung load configurations may even require cancellation of a flight mission due to safety concerns for the load and crew. In certain instances, such cancellation may occur even after a flight mission has been initiated, thereby further increasing the costs and time associated with cancellation.

In light of the foregoing, there is a need for systems and methods directed to improving the stability of slung loads. There is a further need for such systems and methods that require minimal modification to an aircraft to implement, such as by taking advantage of existing hardware and structural components of the aircraft.

SUMMARY OF THE DISCLOSURE

In one implementation of the present disclosure, a hoist support system is provided. The hoist support system includes a rail assembly including a rail and a motor assembly including a motor. The motor assembly is configured to support a hoist and to be moveable along the rail by activating the motor. The hoist support system further includes a control system communicatively coupled to the motor and a motion sensor communicatively coupled to the control system and configured to generate motion signals corresponding to movement of a slung load. The control system is configured to receive the motion signals from the motion sensor, determine a motion of the slung load based on the motion signals, and transmit a motor control signal to actuate the motor based on the motion of the slung load such that actuation of the motor causes repositioning of the motor assembly along the rail.

In another implementation of the present disclosure, a hoist support system for use with a helicopter and coupleable to a fuselage of the helicopter is provided. The hoist support system includes a rail mountable to the fuselage and a motor assembly including a motor, the motor assembly being translatable along the rail by actuation of the motor. The hoist support system further includes a control system communicatively coupled to the motor and configured to receive measurements associated with motion of a slung load of the helicopter. The control system is further configured to selectively actuate the motor in response to the motion associated with the slung load, thereby translating the motor assembly along the rail.

In yet another implementation of the present disclosure, a method of stabilizing a slung load coupled to a vehicle by a rail-mounted hoist system is provided, where the rail-mounted hoist system includes a motor assembly coupled to a hoist and translatable along a rail assembly of the rail-mounted hoist system. The method includes measuring a motion of the slung load and determining, based on the motion of the slung load, a position of the motor assembly along the rail such that movement of the motor assembly to the position attenuates the measured motion of the slung load. The method further includes translating the motor assembly along the rail assembly to the position.

DESCRIPTION OF THE DRAWINGS

The foregoing and other objects, features, and advantages of the present disclosure set forth herein should be apparent from the following description of particular embodiments of those inventive concepts, as illustrated in the accompanying drawings. Also, in the drawings the like reference characters refer to the same parts throughout the different views. The drawings depict only typical embodiments of the present disclosure and, therefore, are not to be considered limiting in scope.

DETAILED DESCRIPTION

Aspects of the present disclosure are directed to a rail-mounted hoist system for use with aircraft, such as helicopters. The rail-mounted hoist system is an external assembly including a hoist coupled to a motor assembly and a rail assembly. The rail assembly acts as a medium between the aircraft and the hoist/motor assembly. The rail assembly replaces the static connection typically used between the hoist and aircraft in conventional hoist systems. The rail assembly allows the hoist and top-cable point to move in relation to the aircraft. For example, in certain implementations the rail assembly allows the hoist and top-cable point to move parallel to the longitudinal axis of the helicopter. The dynamic mounting system provided by the rail-mounted hoist system described herein introduces new variables into the helicopter-cable-slung load system to facilitate stabilization of the slung load. More particularly, the rail-mounted hoist system improves stability of a slung load being carried using the hoist system by enabling movement of the hoist system to attenuate or otherwise control swinging motion of the slung load.

Slung loads often experience large amounts of swing due to, among other things, flight patterns and wind. Such swinging may cause numerous difficulties for pilots and greatly increases the time and effort required to accurately place a slung load in a specified location on the ground or to suspend the slung load at a particular location in the air.

Conventional hoist fixtures have numerous drawbacks and limitations regarding stabilization of slung loads. Notably, such conventional fixtures are statically mounted such that once the hoist is mounted onto a vehicle, the location of the hoist and cable relative to the vehicle cannot change. As a result, existing systems lack mechanisms to dynamically stabilize a slung load by adjusting the location of the hoist relative to the vehicle. More specifically, conventional systems do not include electronic components to sense the load state of the slung load or to otherwise provide feedback regarding the slung load to be used for dynamically controlling swinging. Conventional systems also lack motors or other actuators coupled to the hoist for movement of the hoist system relative to the vehicle in response to the load state such that the hoist may be moved to counteract any swinging. Stabilization of slung loads using conventional fixed hoist system is almost entirely dependent on a pilot's ability to simultaneously observe the slung load and finely control the vehicle as a whole relative to the slung load, which is an extremely difficult task, even for experienced pilots.

Efforts to address the difficulties of handling slung loads under extreme conditions have been primarily directed to improving pilot training and experience and less on improving the control of equipment used in such missions. While pilot skill and ability are important, improvements in controlling equipment, such as hoist systems, allow pilots to focus more on flying and less on monitoring such equipment. In certain missions, such as SAR missions or other critical scenarios where time and efficiency play an essential role, saving mere minutes through such improved control can mean the difference between recovery and serious injury or even death. So, even if a pilot has the skill and ability to control a vehicle to attenuate swinging of a slung load, enabling the pilot to do so in an easier and more efficient manner by taking advantage of automatic and dynamic control elements can lead to significantly improved mission success rates.

In light of the foregoing, there is a clear need for a system to attenuate swinging and other stability-related issues associated with slung loads. Such a system may be compatible with existing mounting systems to improve the ease with which such a system can be integrated into a vehicle.

To address the foregoing issues, among others, the present disclosure provides a rail-mounted hoist system that may be mounted to a vehicle, such as a helicopter. The system includes sensors adapted to measure dynamics of a slung load and actuators for adjusting the location of a hoist of the system in response to such measurements. By making such adjustments, the rail-mounted hoist system provides load-stabilizing functionality that can attenuate or even eliminate swinging of slung loads. In certain implementations, the system integrates seamlessly with a vehicle's existing componentry such that the system may be readily attached or detached from the vehicle in response to changing mission needs.

The rail-mounted hoist system decreases and/or eliminates unintentional swing experienced by slung loads hoisted underneath the helicopter by making a hoist point location variable rather than fixed. In certain implementations, the rail-mounted hoist system may include a hoist, such as a Breeze-Eastern HSS-29900 or other similar hoist, that is mounted to and moveable along a rail assembly rather than fixed to the body of the vehicle at a fixed point. The rail assembly allows variation of the hoist point along the length of the vehicle and, in certain implementations, along the full length of any external doors extending along the side of the vehicle. In certain implementations, the rail-mounted hoist system may be removable, allowing the vehicle to return to a default configuration at any time.

Figure 1:
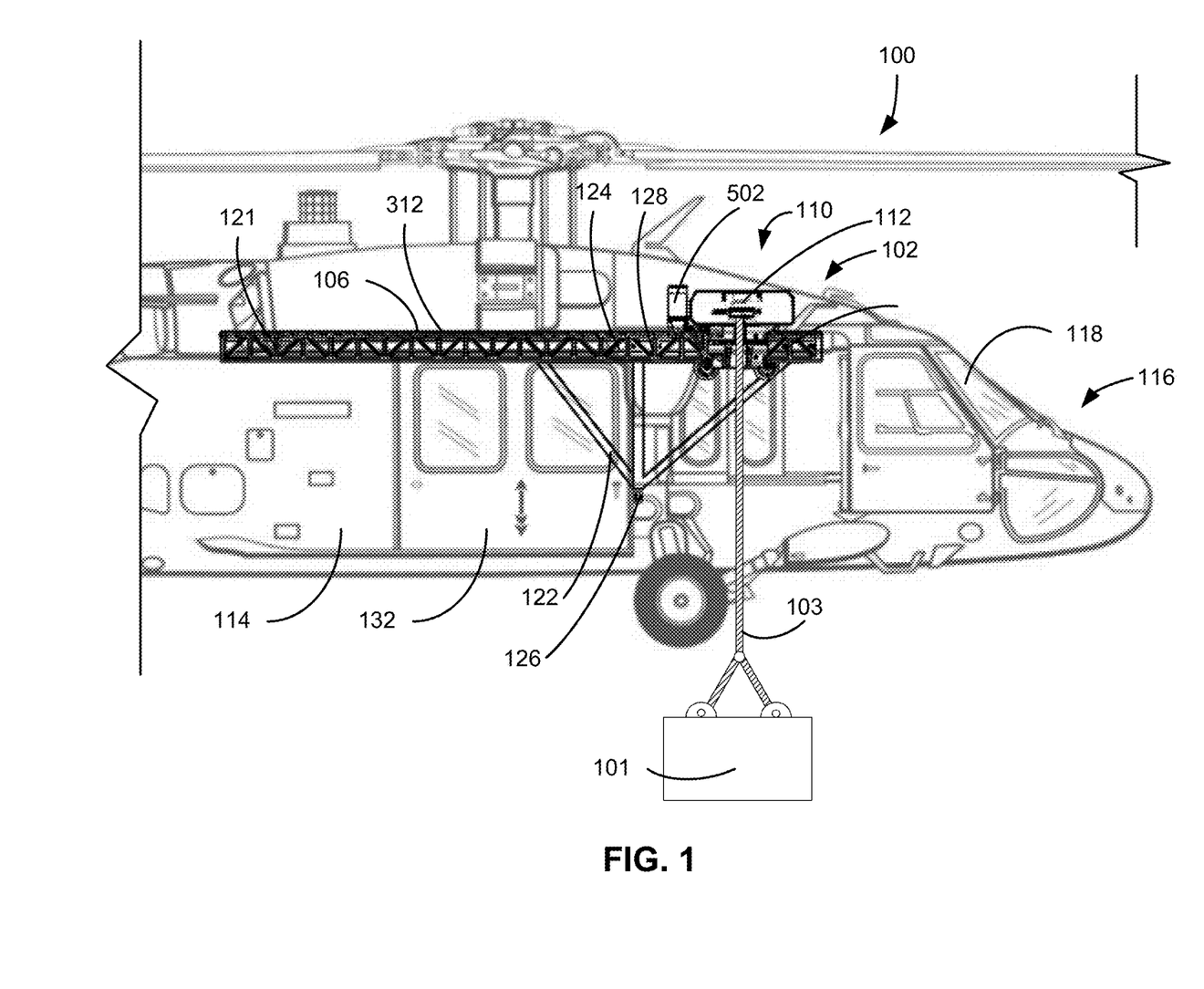
FIG. 1 is a schematic illustration of a helicopter including a rail-mounted hoist system according to the present disclosure.

FIG. 1 is a schematic illustration of a helicopter 100 (also referred to herein as a vehicle 100) including a fuselage 114 to which a rail-mounted hoist system 102 is coupled. The helicopter 100 generally has a leading end 116 at which the vehicle's cockpit 118 is located and with which the helicopter 100 is lead during forward flight. The helicopter 100 may further include a cargo or other door 132 in the side of the fuselage 114.

The rail-mounted hoist system 102 generally includes four subsystems: (1) a mounting structure 122; (2) a rail assembly 106; (3) a translational motor assembly 110, and (4) a hoist 112. The hoist 112 is generally configured to raise and lower a cable 103 which is coupled to a load 101. In certain implementations, the rail-mounted hoist system 102 is preassembled prior to mounting on the fuselage 114 such that only the hard point connections and electronic connections need to be made for the rail-mounted hoist system 102 to be operationally mounted to the fuselage 114.

FIG. 1 depicts a side-view of the helicopter 100 with the rail-mounted hoist system 102 installed. While the exemplary vehicle shown in the diagram is a UH-60 Black Hawk helicopter, the rail-mounted hoist system 102 may be similarly mounted on other aircraft. In certain implementations, the rail-mounted hoist system 102 is mounted using specialized mounting structures for the particular application. For example, the UH-60 Black Hawk helicopter is often configured to include an External Stores Support System (ESSS) including specifically located hard point mounts for external equipment. Accordingly, the rail-mounted hoist system 102 may be configured to be mounted to the ESSS. For example, the helicopter 100 shown in FIG. 1 includes three ESSS hard point mounts 124, 126, 128 disposed on the side of the fuselage 114 and to which the rail-mounted hoist assembly 102 is coupled.

It should be noted that the rail-mounted hoist system 102 may be mounted on either side of the helicopter. In certain implementations, doing so may require reconfiguration of the mounting structure 122 (described below in more detail) such that that mounting structure 122 can connect to hard points on the opposite side of the helicopter 100.

The motor assembly 110 may be translated along the length of the rail assembly 106 by activating a motor 502 of the motor assembly 110. For example, the motor assembly 110 and the rail assembly 106 may define a rack and pinion coupling such that a pinion, gear, or similar component coupled to the motor 502 meshes with a corresponding rack 312 of the rail assembly 106. The rack 312 may run along the length of a rail 120 of the rail assembly 106. Accordingly, as the motor 502 rotates, the motor assembly 110 and the motor 502 are translated along the rail assembly 106. Because the hoist 112 is coupled to the motor assembly 110, such translation also moves the hoist 112 along the length of the rail 120. In certain implementations, when not in use, the motor assembly 110 and the hoist 112 may be translated to a location at the end of the rail assembly 106 such that the rail-mounted hoist system 102 does not obstruct the cargo door 132 or other aspects of the helicopter 100. In certain implementations, the rail-mounted hoist system 102 is also designed to stay as close to the body of the fuselage 114 as possible, thereby reducing obstructions and wind resistance caused by the rail-mounted hoist system 102.

During operation, the motor assembly 110 is dynamically moved along the rail assembly 106 to stabilize the slung load 101. As described below in more detail, such stabilization generally includes receiving measurements from one or more sensors associated with movement of the slung load 101 and then automatically moving the motor assembly 110 along the rail assembly 106 in response to such measured movement in order to dampen or otherwise attenuate swinging of the slung load 101. In one implementation, an accelerometer or similar sensor may be coupled to one or more of the slung load 101 and the cable 103 and may be in communication with a control system or similar computing device of the helicopter 100 adapted to actuate the motor 502 of the motor assembly 110. If the accelerometer provides measurements indicative of forward swinging of the slung load 101, for example, the control system may cause the motor assembly 110 to move forward along the rail assembly 106, thereby reducing the swing. Notably, as the cable distance between the slung load 101 and the helicopter 100 increases, the relative motion of the slung load 101 increases and the motor assembly 110 becomes increasingly dynamic as it makes continuous adjustments to stabilize the slung load. Further details regarding control of the motor assembly 110 is provided below in the context of FIGS. 10 and 11.

Figure 2:
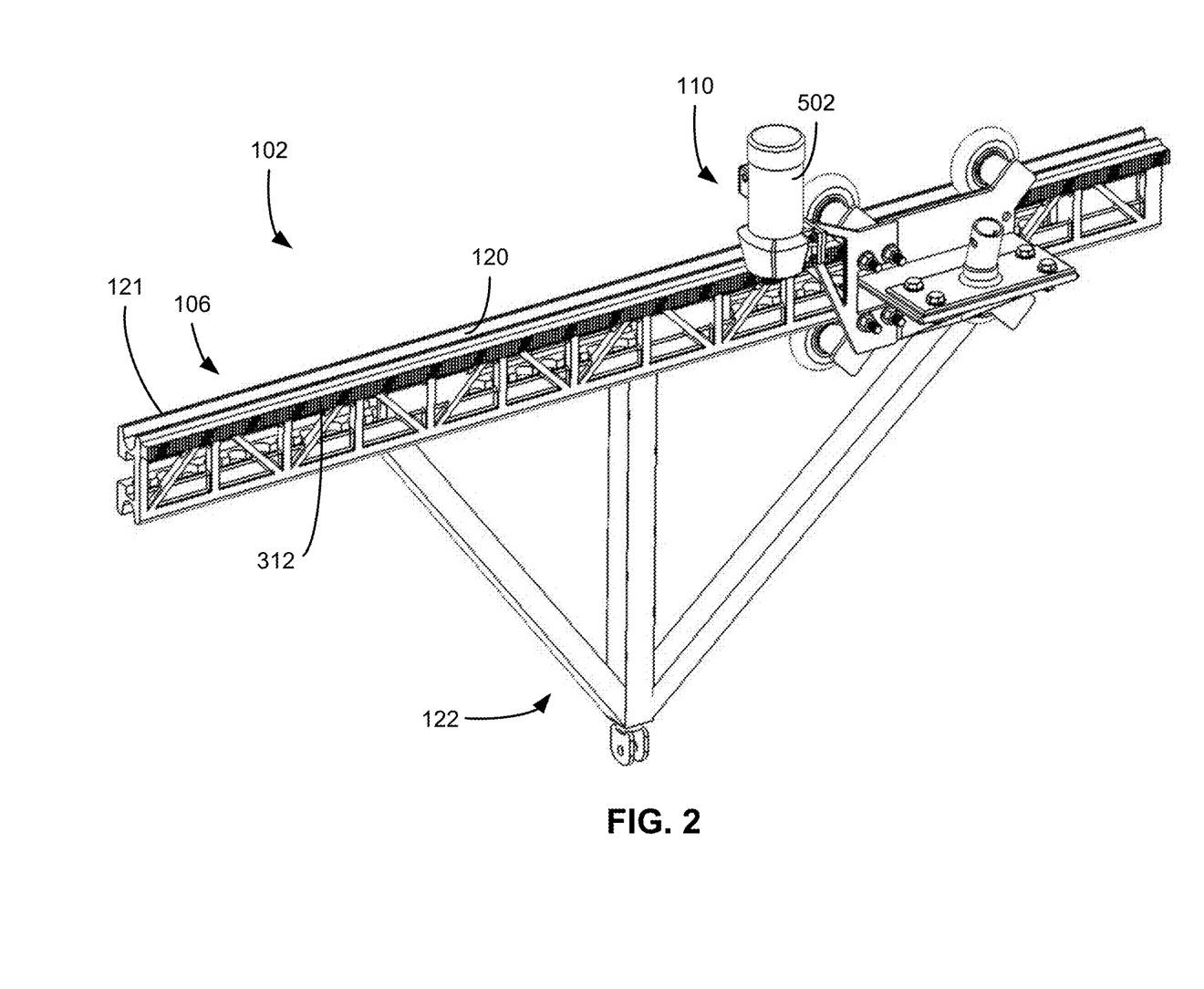
FIG. 2 is an isometric view of the rail-mounted hoist system of FIG. 1 with the hoist removed.

FIG. 2 is an isometric view of the rail-mounted hoist system 102 with the hoist 112 removed for clarity. As discussed in the context of FIG. 1, the rail-mounted hoist system 102 includes a rail assembly 106 that further includes a rail 120, which serves as a structural member as well as a support for on which a motor assembly 110 rides. The rail assembly 106 is coupled to a mounting structure 122 which fastens to the three ESSS hard points 124, 126, 128 of the helicopter 100 shown in FIG. 1. Additional components described above with respect to FIG. 1 are further included in FIG. 2.

As shown in FIGS. 1-2, the mounting structure 122 may be eccentrically mounted to the rail assembly 106 due to the location of the ESSS hard points 124, 126, 128 on the fuselage 114. As a result, a rearward portion 121 of the rail assembly 106 may be cantilevered over the cargo door 132 and extend to the rear of the helicopter 100.

When the rail assembly 106 is mounted to the fuselage 114, the rail 120 and rack 312 extend substantially parallel to the fuselage 114 along the length of the helicopter 100. In certain implementations, the motor assembly 110 may be configured to translate across the full span of the cargo door 132. Because the hoist 112 is mounted to the motor assembly 110, translation of the motor assembly 110 also translates the hoist 112. Also, by positioning the motor assembly 110 at any point along the length of the cargo door 132 the hoist 112 may be used for loading of cargo into or unloading of cargo out of a cargo area of the helicopter 100.

Figure 3:
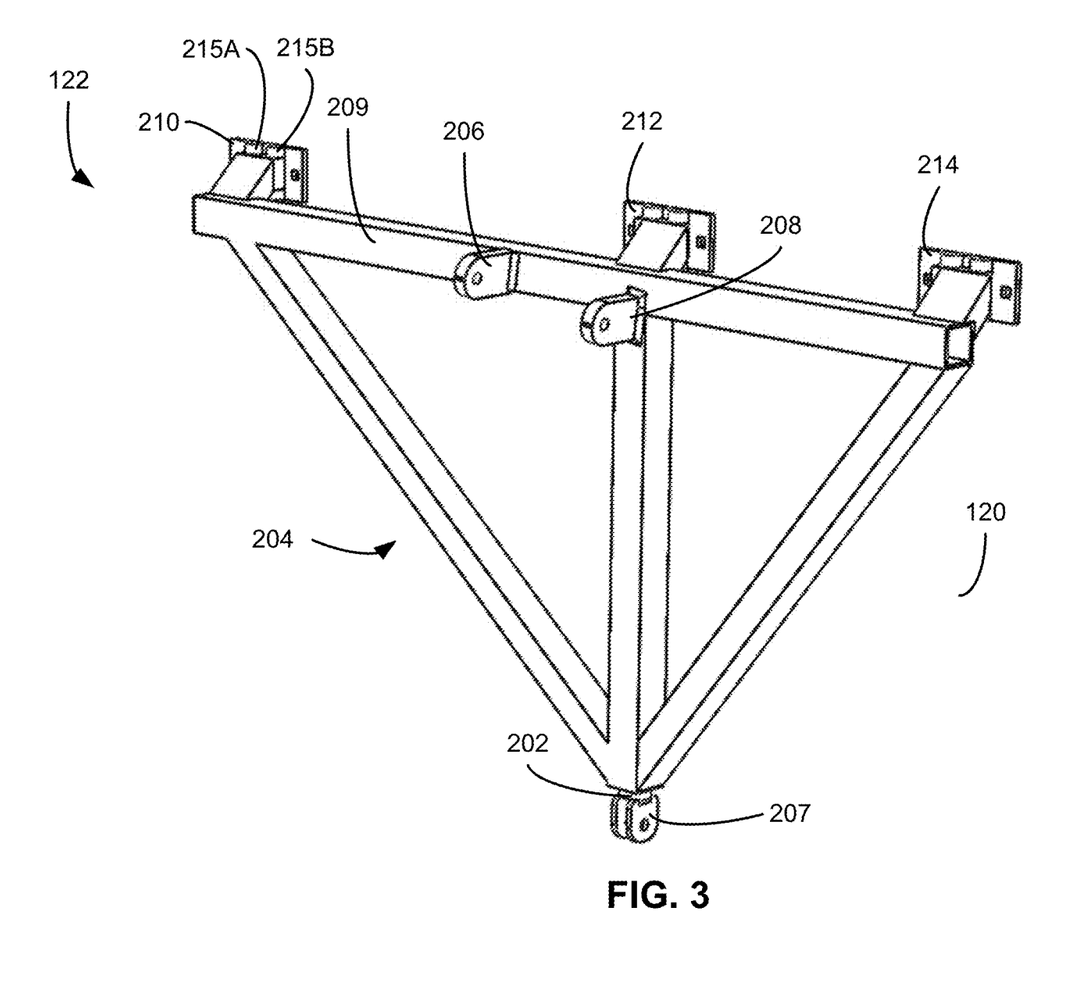
FIG. 3 is an isometric view of a mounting structure of the rail-mounted hoist system of FIGS. 1 and 2.

FIG. 3 is an isometric view of the mounting structure 122. The mounting structure 122 serves as the support for the rail 120 (shown in FIG. 2) and other components of the rail assembly 106. In the illustrated implementation, the mounting structure 122 is a 4-member truss 204 that provides a structural interface between the rail-mounted hoist system 102 and the fuselage 114 (shown in FIG. 1). Although other configurations are possible, the mounting structure 122 is constructed of square tubing welded together to form the truss 204. The mounting structure 122 may include coupling features configured to couple the mounting structure 122 to hard points of the fuselage 114. The mounting structure 122, for example, includes two tabs 206, 208 which may be welded or otherwise coupled to an upper truss member 209 of the mounting structure 122. The tabs 206, 208 are positioned to be received by corresponding mounts of a mounting system, such as the ESSS hard points 124, 128 shown in FIG. 1, coupled to the fuselage 114.

The mounting structure 122 further includes a coupling feature 207 extending from a lower portion of the mounting structure 122. Similar to the tabs 206, 208, the coupling feature 207 is adapted to be received by a corresponding mounting feature of the fuselage 114, such as the ESSS hard point 126 illustrated in FIG. 1, to further mount the rail assembly 106 to the fuselage 114. The coupling feature 207 may be disposed on an end of an adjustable bottom member 202 such that the location of the coupling feature 207 may be adjusted to accommodate different vehicles and mounting arrangements and/or to adjust the angle of the mounting structure 122 relative to the fuselage 114. In certain implementations, for example, the adjustable bottom member 202 may include a tube or other member shaped to be slidably received within the truss 204 such that the location of the coupling feature 207 may be adjusted by extending or retracting the adjustable bottom member 202 relative to the truss 204. In other implementations, the adjustable member 202 may be threaded into the bottom of the truss 204 such that location of the coupling feature 207 may be adjusted by rotating the adjustable member 202 relative to the truss 204. In certain implementations, such angular adjustment is the sole adjustment required to alter the angle of the mounting structure 122, rail assembly 106, motor assembly 110, and hoist 112.

Bolts or similar fasteners may be inserted and fixed through the tabs 206, 208 and the coupling feature 207 to secure the mounting structure 122 to mounting features/hard points of the fuselage 114. In certain implementations, the tabs 206, 208 may be angled such that the rail 120, when mounted, is level along the length of the helicopter 100. Also, the truss 204 of the mounting structure 122 may be generally shaped configured to reduce obstruction of the cargo door 132 (shown in FIG. 1) as much as possible by elevating the rail assembly 106 of the entire rail-mounted hoist system 102 above the cargo door 132.

The mounting structure 122 may further include rail tabs 210, 212, 214, configured to couple the mounting structure 122 to the rail assembly 106 and to reduce deflection of the rail 120 during loaded conditions. In certain implementations, the rail tabs 210-214 may include semi-circular or similar bosses, such as bosses 215A, 215B of rail tab 210. Such bosses 215A, 215B may be received by corresponding cutouts, scallops, or similar indentations (such as indentations 216 shown in FIG. 5) of the rail assembly 106 to couple the mounting structure 122 to the rail assembly 106.

Figure 4:
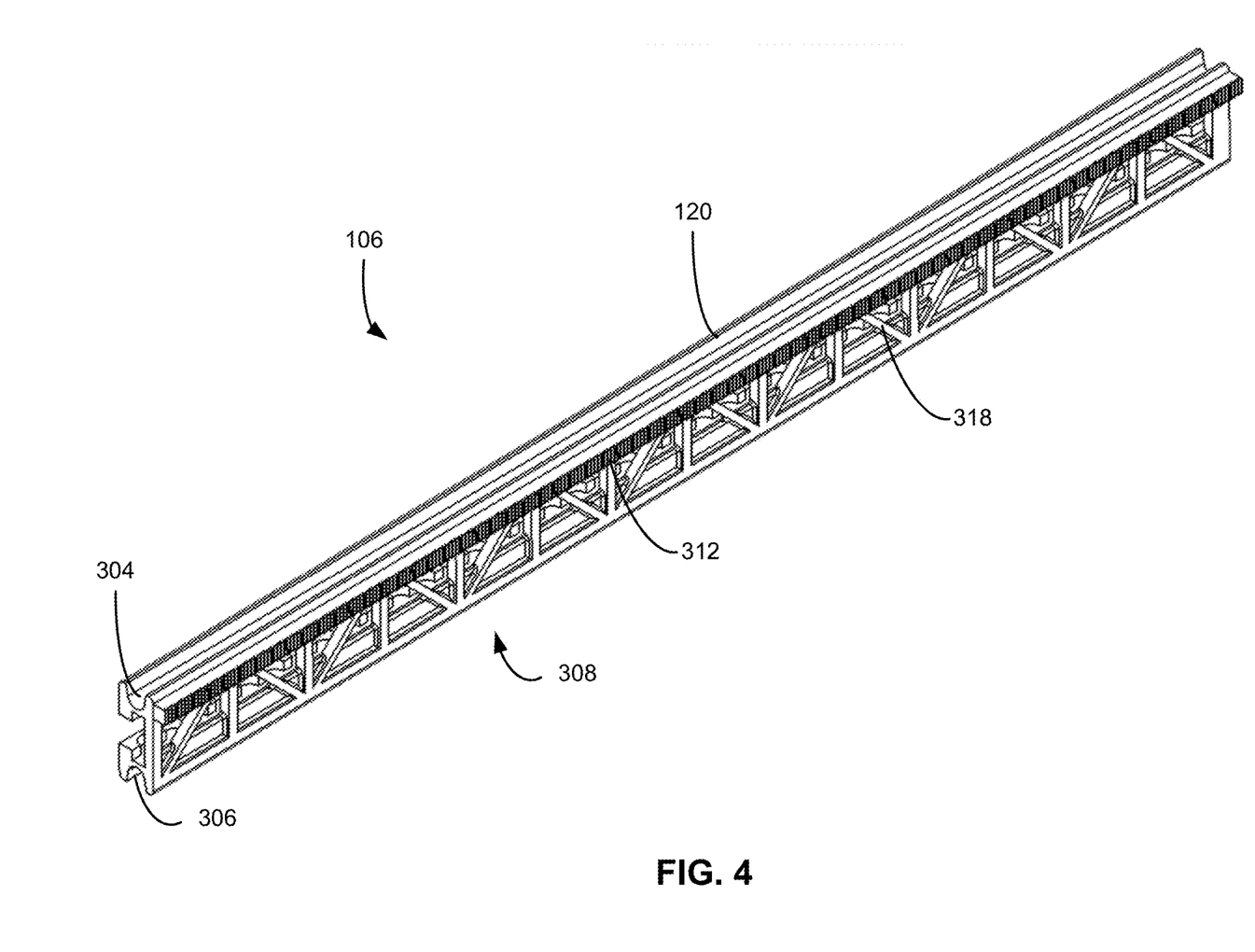
FIG. 4 is a first isometric view of the rail assembly of FIGS. 1 and 2.
Figure 5:
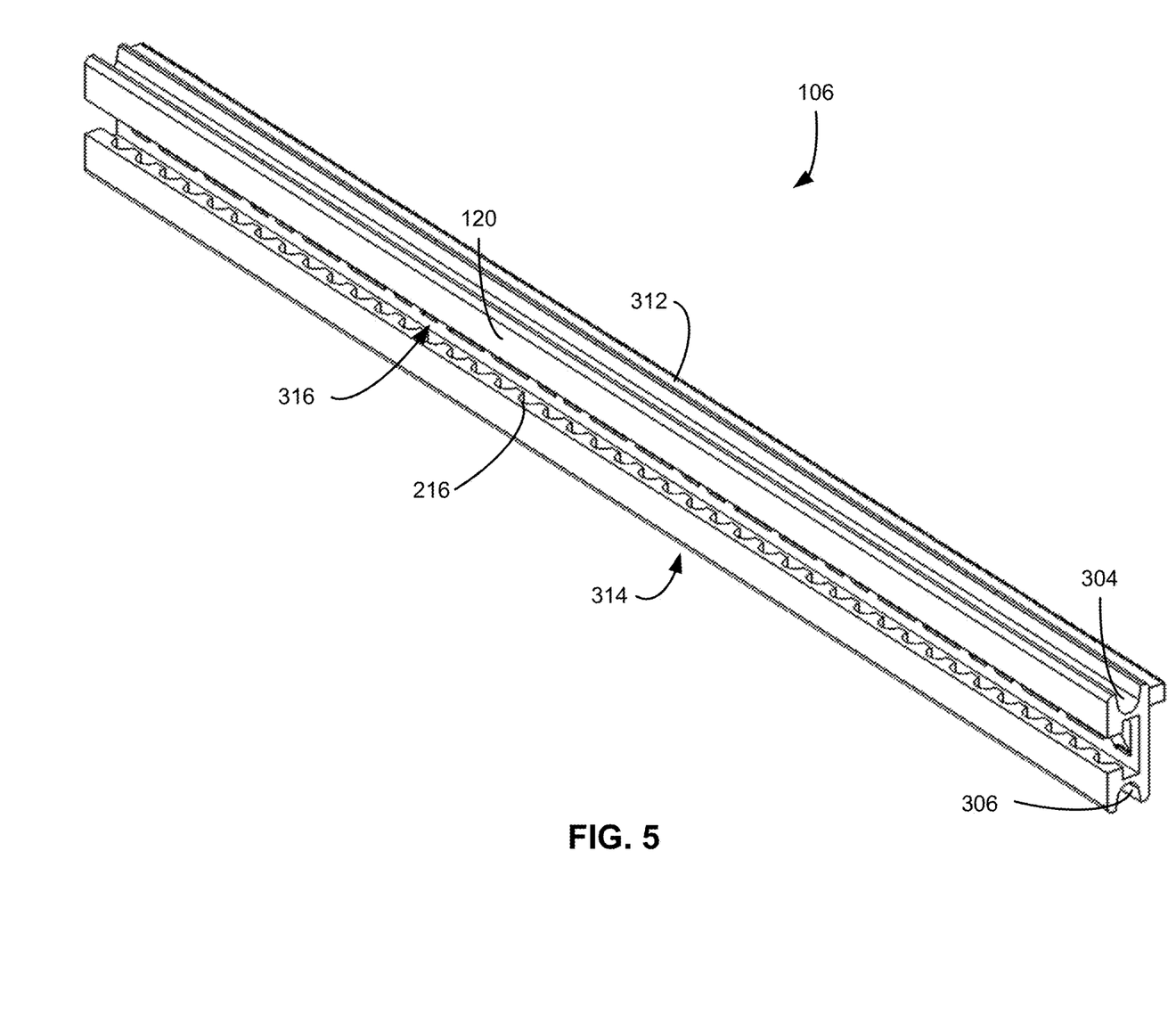
FIG. 5 is a second isometric view of the rail assembly of FIGS. 1 and 2.

FIGS. 4 and 5 are isometric views of the rail assembly 106. The rail assembly 106 generally includes a rail 120, which, in certain implementations, may be a single machined piece of solid material. The rail 120 may be also manufactured, in whole or in part, using one or more other processes including, without limitation, extrusion, 3D printing, casting, and bending. The rail 120 may include one or more modular rail sections coupled together.

In certain implementations, the rail 120 includes a top groove 304 and a bottom groove 306 that extend along the length of the rail 120 and that serve as tracks within which the motor assembly 110 rides. The opposing groove arrangement reduces the likelihood of wheels of the motor assembly 110 slipping off the rail 120 and facilitates smooth, durable operation of the motor assembly 110.

In certain implementations, a gear rack 312 is mounted onto a front side 308 of the rail 120. The gear rack 312 may be coupled to the rail 120 in various ways including, without limitation, welding, brazing, or coupling using one or more fasteners. For example, each of the rail 120 and the gear rack 312 may include through holes along their respective lengths such that bolts or similar fasteners may be used to couple the gear rack 312 of the rail 120. In other implementations, the gear rack 312 and the rail 120 may instead be a unitary assembly in which the gear rack 312 is machined or otherwise formed from the same piece of material as the rail 120. As illustrated in FIG. 4, the rail 120 may have an internal truss structure 318 to reduce weight and material costs associated with the rail 120 while maintaining overall strength of the rail 120.

As shown in FIG. 5, a rear side 314 of the rail 120 may be configured to receive the mounting structure 122. More specifically, a channel 316 may be formed along the length of the rail 120 such that the mounting tabs 210-214 of the mounting structure 122 may be inserted into the rail 120. The channel 316 generally extends along the length of the rail 120 to allow for positioning of the mounting structure 122 along the rail 120. As a result, the position of the mounting structure 122 along the rail 120 may be varied to accommodate different sizes and types of vehicles. Moreover, in certain implementations, multiple mounting structures may be inserted into the channel 316 to provide additional support for the rail-mounted hoist system 102. As previously discussed in the context of FIG. 3, the channel 316 may include a series of cutouts, scallops, grooves, or similar indentations, such as indentation 216, extending along its length. The indentations are generally shaped to receive corresponding bosses of the mounting structure, such as the bosses 215A, 215B of the mounting structure 122 illustrated in FIG. 3.

Figure 6:
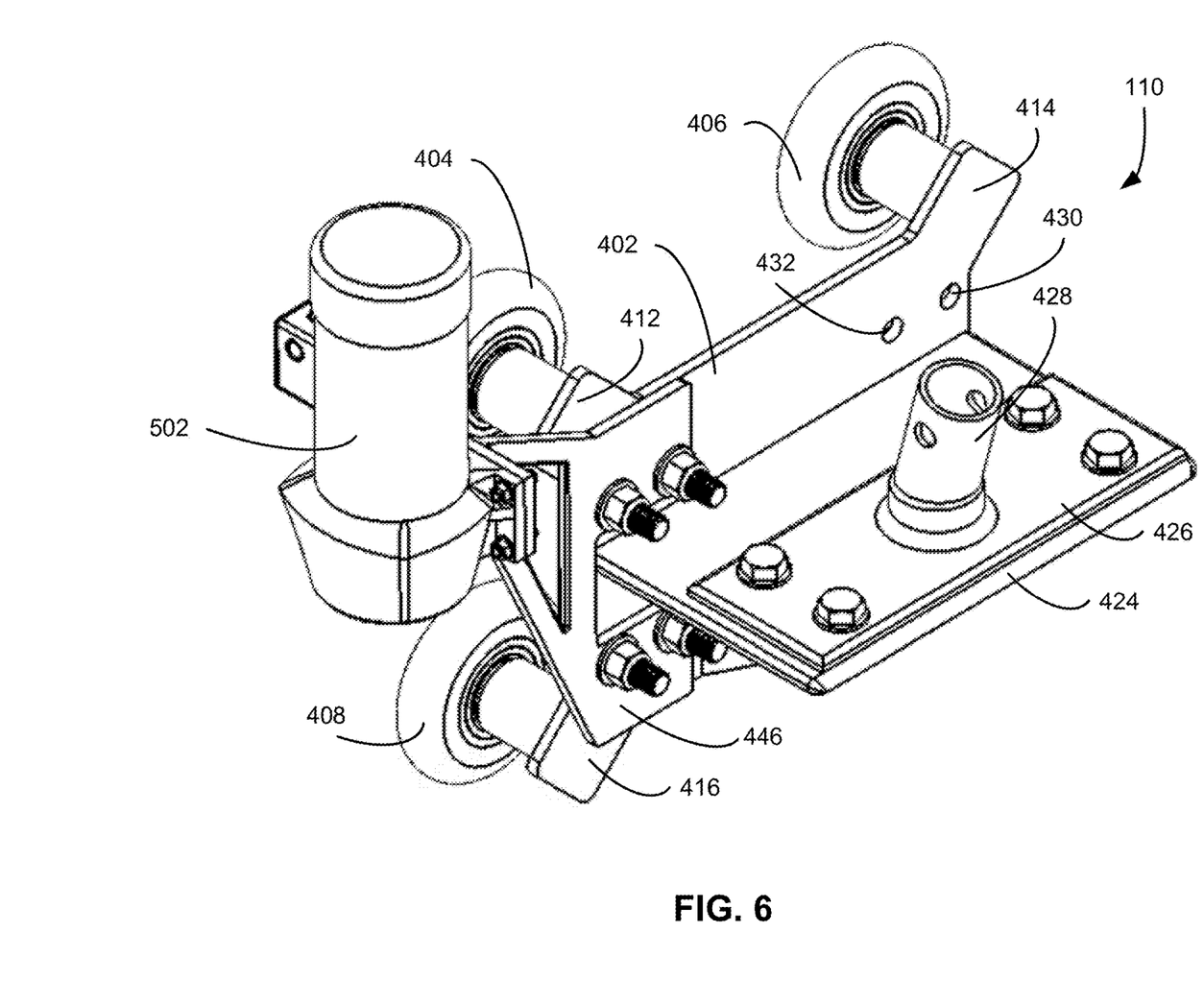
FIG. 6 is a first isometric view of a motor assembly of the rail-mounted hoist system of FIGS. 1 and 2.
Figure 7:
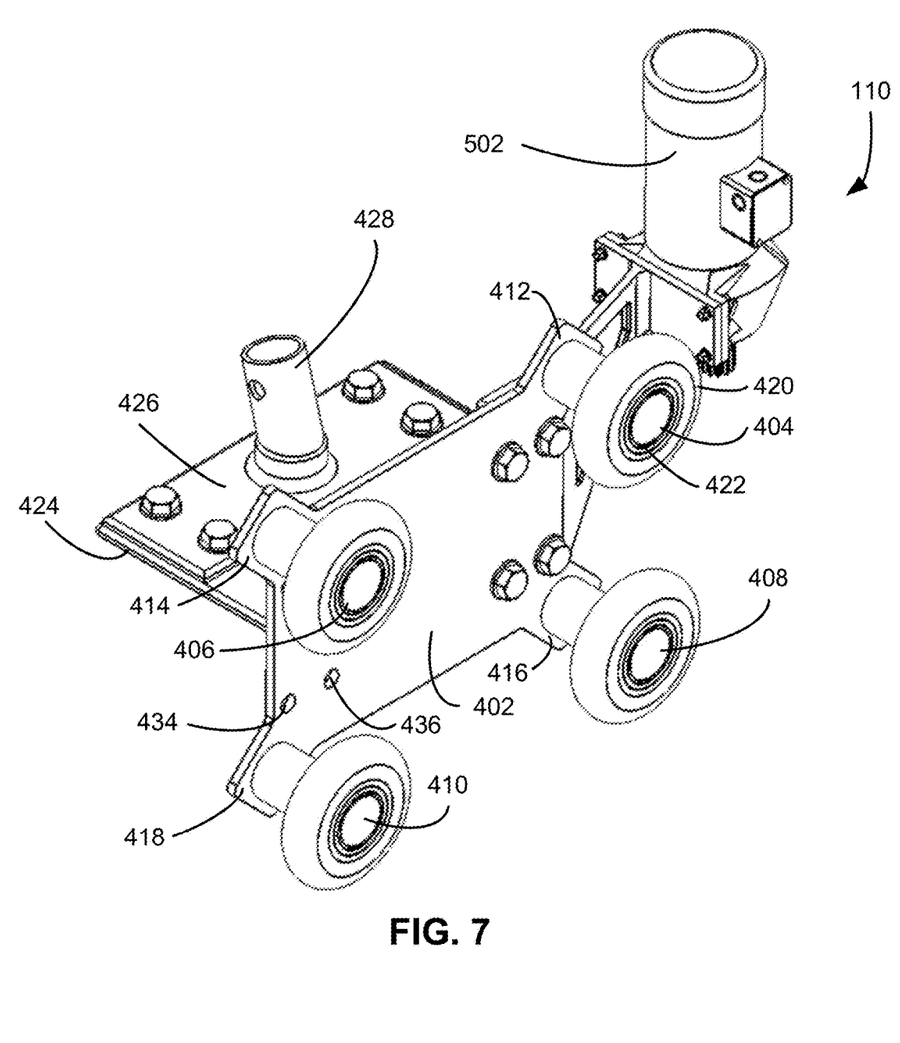
FIG. 7 is a second isometric view of the motor assembly of FIG. 6.

FIGS. 6 and 7 are isometric views of the motor assembly 110. The motor assembly 110 includes a base plate 402 onto which wheel assemblies 404, 406, 408, 410 are mounted. In certain implementations, the wheel assemblies 404-410 are mounted on corresponding hubs 412, 414, 416, 418. Each wheel assembly 404-410 generally includes a wheel and a bearing. For example and as illustrated in FIG. 7, wheel assembly 404 includes a wheel 420 and a bearing 422. In certain implementations, the bearings 422 are dual extreme duty bearings such that the motor assembly 110 includes a total of eight bearings distributed between the four wheels. The wheels may be shaped such that their outer profile fits within the top and bottom grooves 304, 306 of the rail 120 (shown in FIGS. 4 and 5) in order to reduce vibration and play between the wheels and the rail 120.

The hubs 412-418 may be machined separately and welded or otherwise coupled to the base plate 402 or may be integrally formed with the base plate 402. In certain implementations, the wheel assemblies 404-410 are mounted to the hubs 412-418 and kept in place using snap rings (not shown) that allow for quick replacement of the wheel assemblies 404-410 in the event of failure or wear.

A gusseted shelf 424 or similar extension may be coupled to or integrally formed with the base plate 402. The shelf 424 facilitates mounting of a hoist to the motor assembly 110. For example, the shelf 424 may include an adapter plate 426 configured to couple with a hoist. The adapter plate 426, for example, may be a Breeze-Eastern adapter plate configured to couple the motor assembly 110 to a Breeze-Eastern hoist using an angled, circular tube 428 that is inserted into a hoist during assembly. In certain implementations, the adapter plate 426 is removably coupled to the shelf 424 such that it can be exchanged with a different adapter plate for mounting a different size or type of hoist.

The motor assembly 110 further includes a motor 502 coupled to the base plate 402 by a motor mount 446. In certain implementations, the motor mount 446 is constructed from two machined plates, welded together at their intersection. The motor 502 is then fastened to the motor mount 506 via a bolted, or similar, connection. As illustrated in FIGS. 6-7, the motor 502 is bolted to the motor mount 406, which is in turn bolted to the base plate 402. Notably, the base plate 402 illustrated in FIGS. 6-7 includes an alternate set of holes 430-436 to with which the motor mount 446 may be coupled to the base plate 402 to flip the orientation of the motor 502. In other implementations of the present disclosure, the motor mount 406 may be integrally formed with the base plate 402.

Figure 8:
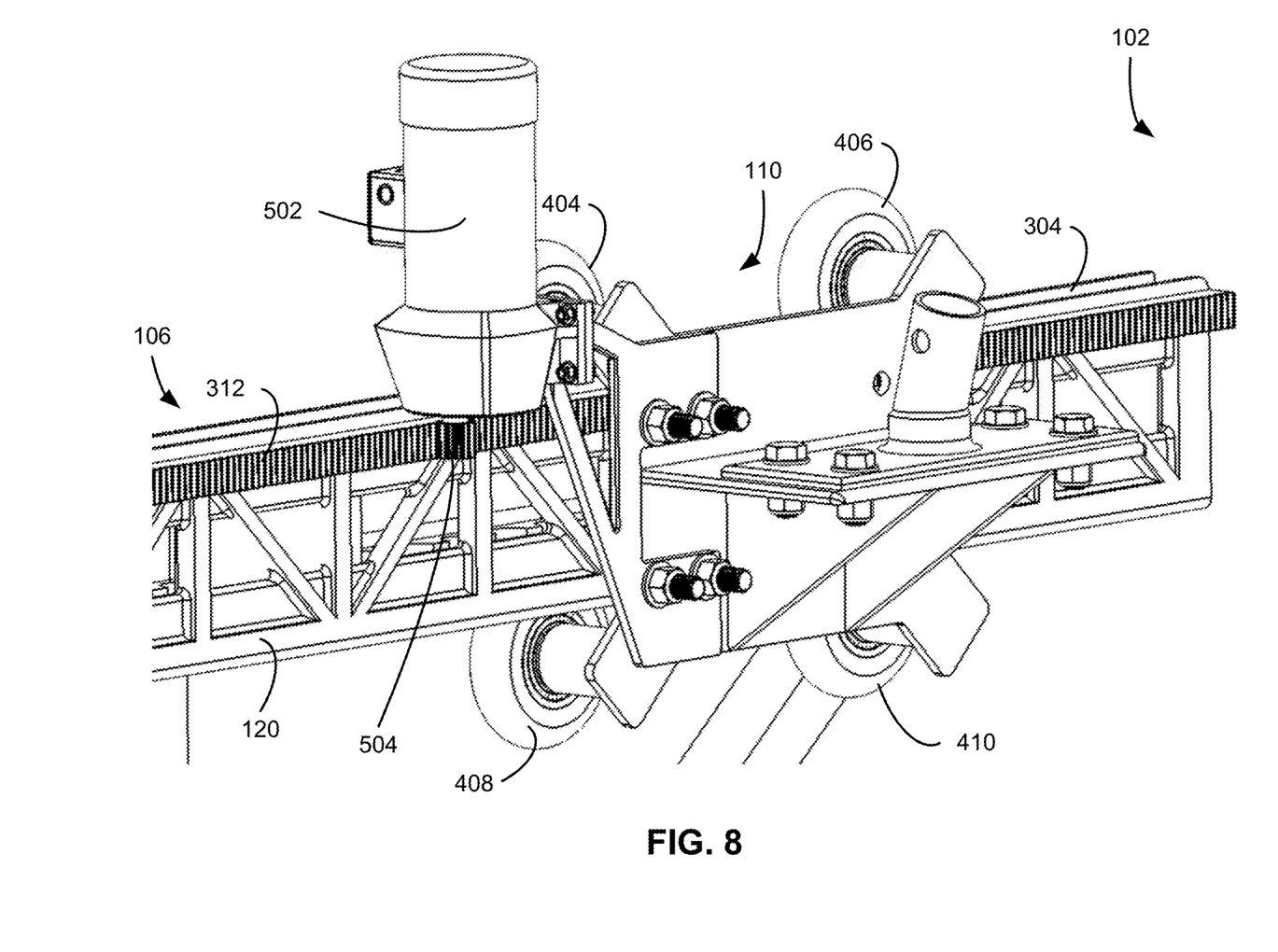
FIG. 8 is a detailed isometric view of the rail-mounted hoist system of FIGS. 1 and 2 illustrating the coupling of the motor assembly to the rail assembly.

FIG. 8 is a detailed isometric view of the rail-mounted hoist system 102 in which the motor assembly 110 is shown as being operably coupled to the rail 120 of the rail assembly 106. More specifically, the wheel assemblies 404-410 are disposed within the upper groove 304 and the lower groove 306 (shown in FIGS. 4-5) of the rail 120 and a pinion 504 coupled to an output shaft of the motor 502 is engaged with the gear rack 312 of the rail assembly 106. The pinion 504 mates with the gear rack 312 such that rotation of the pinion 504 drives the motor assembly 110 and, by extension, a hoist (such as the hoist 112 of FIG. 1) coupled to the motor assembly 110 along the gear rack 312. By selectively activating the motor 502 to rotate in a clockwise or counterclockwise direction, the motor assembly 110 may be made to translate along the gear rack 312 in either direction. In certain implementations, the motor assembly 110 may further include one or more of a gearbox and braking system (not shown) to provide further control of the motor assembly 110 and corresponding movement of the motor assembly 110 along the gear rack 312.

Figure 9:
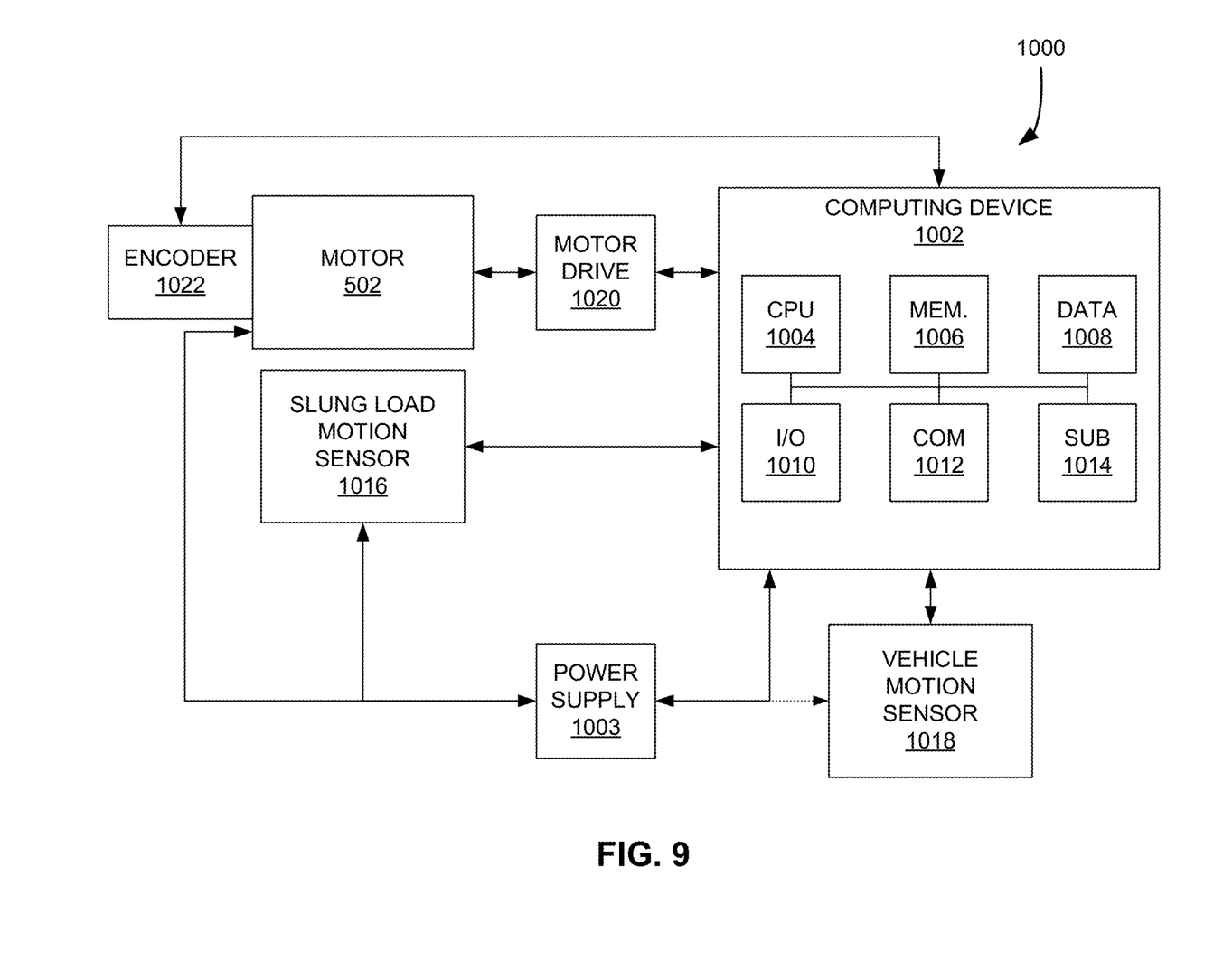
FIG. 9 is a block diagram of an electronic control system of the rail-mounted hoist system of FIGS. 1 and 2.

FIG. 9 is a block diagram illustrating a control and electrical system 1000 for use with the rail-mounted hoist system 102 of FIG. 1. With reference to FIGS. 1-8, the control system 1000 includes external sensory equipment from which motion data corresponding to the slung load 101 is collected. The control system 1000 receives motion data from the external sensory equipment and, based at least in part on the motion data, determines how and where to position the motor assembly 110 along the rail 120 of the rail assembly 106 to best attenuate or eliminate pendular movement of the slung load 101. In certain implementations, at least a portion of the components of the control system 1000 are integrated into or otherwise coupled to the vehicle 100 and receive power from a power supply 1003 of the vehicle 100. During a flight, the control system 1000 may be manually or automatically activated. For example, the control system 1000 may be manually activated by a switch or similar control available to a pilot or crew member or may automatically activate in response to detecting a load on the hoist 112.

The control system 1000 includes a computing device 1002 that further includes a processor 1004 (CPU), a memory 1006 (MEM), a data storage device 1008 (DATA), an input/output port 1010 (I/O), a communication port 1012 (COM), and a sub-system port 1014 (SUB), all of which may be communicatively coupled by a bus 1003 or similar data communication system. During operation, the processor 1004 retrieves and executes instructions stored in the memory 1006 to perform stabilization of the slung load 101. In certain implementations, the processor 1004 may also retrieve or store data in the data storage device 1008. For example, the processor 1004 may record sensor and performance data to the data storage device 1008 or retrieve control parameters, historical data, or other data for use in performing load stabilization. The I/O port 1010 may be coupled to one or more sensors (described below in more detail) for collecting data including motion data of the slung load 101, motion data of the vehicle 100, operational parameters retrieved from the hoist 112, operational parameters retrieved from the motor 502, and the like. Each of the communication port 1012 and the sub-system port 1014 may be used to facilitate communication of data between the control system 1000 and other systems, including other onboard systems of the vehicle 100 and other remote ground-based and/or aerial systems.

The computing device 1002 of FIG. 9 is intended to be illustrative of only one potential configuration of a computing device that may be used to implement the control system 1000. Other computing devices may include more or fewer components than the computing device 1002 of FIG. 9. For example, other suitable computing devices may include multiple processors and/or memories or exclude components, such as the communication port 1012. Moreover, although described separately, the functionality of any or all of the components of the computing device 1002 or other computing devices in accordance with this disclosure may be combined.

The control system 1000 further includes a plurality of sensors which are communicatively coupled to the computing device 1002. For example, such sensors may include, without limitation, a slung load motion sensor 1016, a vehicle motion sensor 1018, and an encoder 1020. The slung load motion sensor 1016 may be coupled to or located proximate the slung load 101 to provide data corresponding to the position, orientation, and movement of the slung load 101. The vehicle motion sensor 1018 may be coupled to the fuselage 114 and to provide data corresponding to the position, orientation, and movement of the vehicle 100. In certain implementations, the vehicle motion sensor 1018 includes one or more motion sensors that are normally integrated into the vehicle 100 to track movement of the vehicle 100. One or more of the slung load motion sensor 1016 and the vehicle motion sensor may be a 9-axis motion sensor package that combines a triaxial accelerometer, a triaxial gyroscope, and a triaxial geomagnetic sensor. In such sensor packages, the data collected from the accelerometer and the gyroscope may be used to control the translational position of the motor assembly 110 along the rail 120 and the geomagnetic sensor may be used to determine the orientation of the slung load with respect to the vehicle 100.

Data collected from each of the slung load motion sensor 1016 and the vehicle motion sensor 1018 may be passed to the computing device 1002 which may then execute a stabilization algorithm stored within the computing device 1002. In addition to motion sensor data corresponding to the slung load, the algorithm may further consider data including, without limitation, one or more of motion data of the vehicle 100, characteristics of the slung load 101 (such as weight, shape, center of gravity, and the like), geometric parameters of the vehicle 100 and any systems thereof, flight characteristics of the vehicle 100, wind and other environmental conditions, performance characteristics of the motor 502, and the like. In certain implementations, such data may be stored in and retrieved from a table, database, or similar data storage structure of the data storage device 1008.

Based on the received data, the algorithm generates a movement plan to position the motor assembly 110 and, as a result, the hoist 112 along the rail 120 in a manner that attenuates movement of the slung load 101. Generating the movement plan may include determining one or more of a final location of the motor assembly 110 along the rail 120, a velocity profile describing the velocity at which the motor assembly 110 is moved along the rail 120, and an acceleration profile describing the accelerations applied to the motor assembly 110. The computing device 1002 then generates control signals corresponding to the movement plan and transmits the control signals to the motor drive 1020. The motor drive 1020 converts the relatively low power control signals received from the computing device 1002 into higher powered signals suitable for driving the motor 502 of the motor assembly 110 in accordance with the movement plan. An encoder 1022 coupled to the motor 502 may be used to provide dynamic feedback regarding one or more of the position, velocity, and acceleration of the motor assembly 110 to the computing device 1002. In other implementations, accelerometers or similar sensors may also be used to provide feedback regarding the movement of the motor assembly 110 along the rail 120.

In certain implementations, the control algorithm executed by the computing device 1002 may include proportional-integral-derivative (PID) control algorithms or similar algorithms in which the value being controlled is one or more or the position, velocity, or acceleration of the slung load 101 as measured using the slung load motion sensor 1016. The models governing the control algorithms may also rely on additional data including, without limitation, vehicle dynamic and kinematic data obtained using the vehicle motion sensor 1018, environmental conditions, and dynamic and kinematic data of the motor assembly 110. In certain implementations, the computing device 1002 may execute a machine learning algorithm or other adaptive algorithm that continuously improves the primary control algorithm, such as by refining coefficient values or weights associated with different variables used in the control algorithm. Such an adaptive algorithm may rely entirely on data corresponding to the vehicle 100 within which the computing device 1002 is implemented or, in certain implementations, may rely on data collected from multiple vehicles. For example, multiple vehicles including a rail-mounted hoist system in accordance with this disclosure may each be communicatively coupled to a central server or similar computing device such that each vehicle may upload its respective data. The collected data may then be used to train or otherwise refine one or more of the adaptive algorithm or the primary control algorithm, which may then be distributed by the central server to each of the vehicles for implementation.

Figure 10:
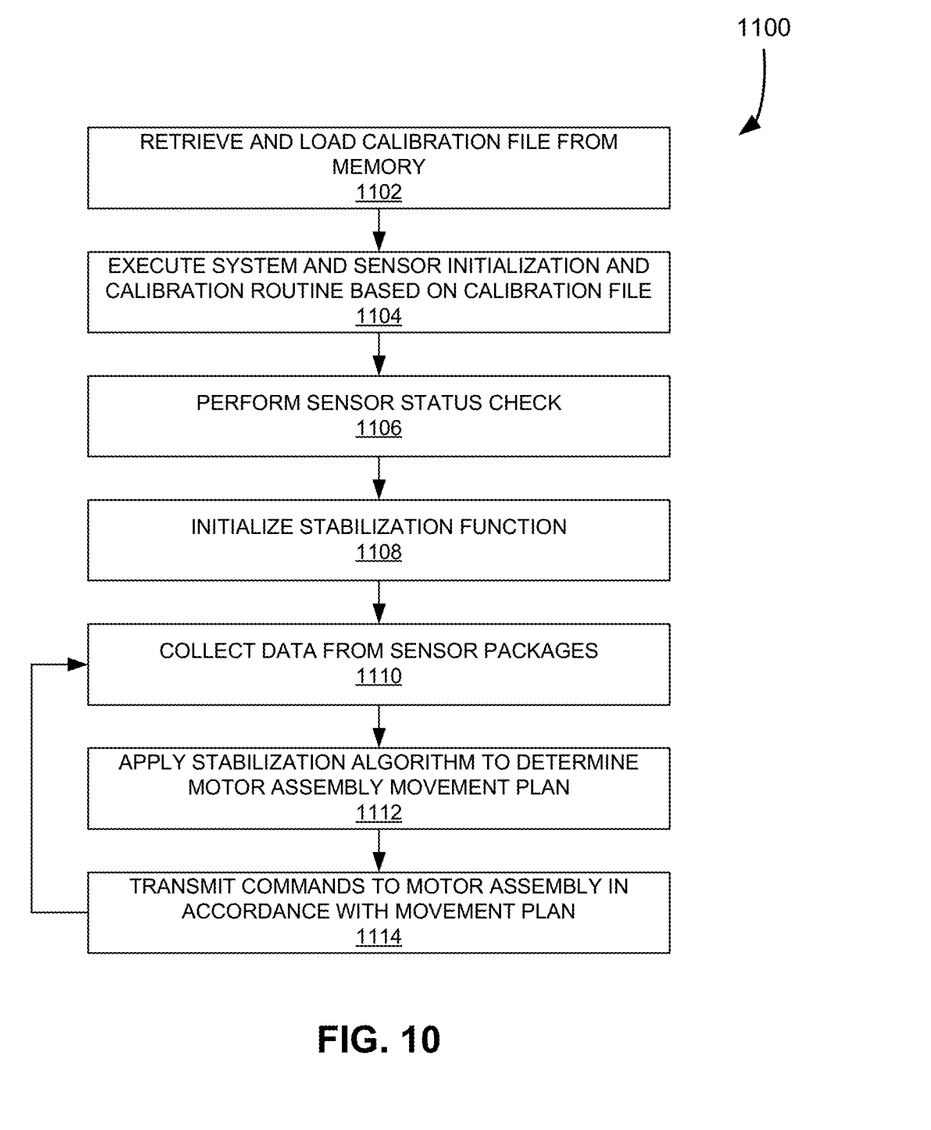
FIG. 10 is a flow chart illustrating a method of operating a rail-mounted hoist system in accordance with this disclosure.

FIG. 10 is a flow chart illustrating a method 1100 of controlling a rail-mounted hoist system in accordance with this disclosure. With reference to FIGS. 1-9, the method 1100 generally includes initialization of the rail-mounted hoist system and execution of a control loop in which sensor data is obtained and analyzed to determine motion of the slung load 101 and how to reposition the motor assembly 110 to attenuate the motion of the slung load 101.

At system startup, a calibration file may be retrieved from memory and loaded (operation 1102). For example, the processor 1004 of the computing device 1002 may retrieve the calibration file from the memory 1006 and load the calibration file for execution. The processor 1004 may then execute a calibration routine based on the calibration file (operation 1104). Execution of the configuration file generally causes the processor 1004 to initialize sensor packages of the control system 1000, such as the load motion sensor 1016 and the vehicle motion sensor 1018. In certain implementations, initialization of the sensor packages is performed such that precise positioning of the sensor packages during system startup is not required. For example, as part of the initialization process, each of the sensor packages may undergo an auto-calibration routine independent of the position of the sensor packages.

After or as part of initializing the sensor packages, a status check is performed to ensure that the sensors are functioning properly (operation 1106). Once the status check is completed, the processor 1004 initializes a stabilization function (operation 1108). The stabilization function may be implemented as a control loop. In the method 1100 of FIG. 11, for example, the control loop includes collecting data from the sensor packages (operation 1110), applying a stabilization algorithm to the collected data (operation 1112) to analyze swing patterns of the slung load 101, and transmitting a command to the motor assembly 110 to translate the motor assembly 110 based on the results of the stabilization algorithm (operation 1114). The loop represented by operations 1112-1116 may be repeated until the system is shut down by a user.

While the present disclosure has been described with reference to various implementations, it will be understood that these implementations are illustrative and that the scope of the present disclosure is not limited to them. Many variations, modifications, additions, and improvements are possible. More generally, embodiments in accordance with the present disclosure have been described in the context of particular implementations. Functionality may be separated or combined differently in various embodiments of the disclosure or described with different terminology. These and other variations, modifications, additions, and improvements may fall within the scope of the disclosure as defined in the claims that follow.

It should be understood from the foregoing that, while particular embodiments have been illustrated and described, various modifications can be made thereto without departing from the spirit and scope of the invention as will be apparent to those skilled in the art. Such changes and modifications are within the scope and teachings of this invention as defined in the claims appended thereto.

What is claimed is:

1. A hoist support system comprising:
   a rail assembly comprising a rail, the rail including each of an upper and a lower groove extending along the length of the rail;
   a motor assembly comprising a motor and a plurality of wheels, the motor assembly configured to support a hoist and to be moveable along the rail by activating the motor, each wheel of the plurality of wheels disposed within one of the upper and the lower groove;
   a control system communicatively coupled to the motor; and
   a motion sensor communicatively coupled to the control system and configured to generate motion signals corresponding to movement of a slung load;
   wherein the control system is configured to:
      receive the motion signals from the motion sensor;
      determine a motion of the slung load based on the motion signals; and
      transmit a motor control signal to actuate the motor based on the motion of the slung load, wherein actuation of the motor causes repositioning of the motor assembly along the rail.

2. The hoist support system of claim 1, wherein the rail assembly is coupleable to a vehicle fuselage by an External Stores Support System (ESSS).

3. The hoist support system of claim 1, wherein the motion sensor is a 9-axis motion sensor comprising each of a triaxial accelerometer, a triaxial gyroscope, and a triaxial geomagnetic sensor.

4. The hoist support system of claim 1, wherein the rail assembly comprises a rack coupled to and extending along the rail, and the motor assembly comprises a pinion coupled to an output shaft of the motor, the pinion mated with the rack such that actuation of the motor causes rotation of the pinion and translation of the motor assembly along the rack.

5. The hoist support system of claim 1, wherein the rail assembly is adapted to be indirectly coupled to a fuselage of a vehicle by a mounting structure, the mounting structure comprising:
   a truss structure comprising a plurality of truss elements; and
   a plurality of mounting features coupled to the truss structure, the plurality of mounting features configured to be received and coupled to corresponding features of a body of the vehicle.

6. The hoist support system of claim 5, wherein the truss structure includes at least one adjustable member including a mounting feature of the plurality of mounting features, the adjustable member adapted to adjustably extend from the truss structure.

7. The hoist support system of claim 5, wherein the rail defines an internal channel and the mounting structure includes a plurality of rail tabs received within the channel.

8. The hoist support system of claim 7, wherein each of the plurality of rail tabs includes a boss projecting from the rail tab and the channel includes a plurality of indentations shaped to receive the bosses of the plurality of rail tabs.

9. The hoist support system of claim 1 further comprising a hoist coupled to the motor assembly.

10. A hoist support system for use with a helicopter and coupleable to a fuselage of the helicopter, the hoist support system comprising:
   a rail mountable to the fuselage, the rail including each of an upper and a lower groove extending along the length of the rail;
   a motor assembly comprising a motor and a plurality of wheels, the motor assembly translatable along the rail by actuation of the motor, each wheel of the plurality of wheels disposed within one of the upper and the lower groove; and
   a control system communicatively coupled to the motor, the control system configured to receive measurements associated with motion of a slung load of the helicopter and to selectively actuate the motor in response to the motion associated with the slung load, thereby translating the motor assembly along the rail.

11. The hoist support system of claim 10 further comprising a truss coupled to the rail, the truss configured to be coupled to the fuselage such that the rail is supported along the fuselage.

12. The hoist support system of claim 10 further comprising a hoist coupled to the motor assembly.

13. A hoist support system comprising:
   a rail assembly comprising a rail, the rail assembly adapted to be indirectly coupled to a fuselage of a vehicle by a mounting structure, the mounting structure comprising:
      a truss structure comprising a plurality of truss elements; and
      a plurality of mounting features coupled to the truss structure, the plurality of mounting features configured to be received and coupled to corresponding features of a body of the vehicle;
   a motor assembly comprising a motor, the motor assembly configured to support a hoist and to be moveable along the rail by activating the motor;
   a control system communicatively coupled to the motor; and
   a motion sensor communicatively coupled to the control system and configured to generate motion signals corresponding to movement of a slung load;
   wherein:
      the control system is configured to:
         receive the motion signals from the motion sensor;
         determine a motion of the slung load based on the motion signals; and
         transmit a motor control signal to actuate the motor based on the motion of the slung load, wherein actuation of the motor causes repositioning of the motor assembly along the rail, and
      the rail defines an internal channel, and
      the mounting structure includes a plurality of rail tabs received within the channel.

14. The hoist support system of claim 13, wherein the rail assembly is coupleable to a vehicle fuselage by an External Stores Support System (ESSS).

15. The hoist support system of claim 13, wherein the motion sensor is a 9-axis motion sensor comprising each of a triaxial accelerometer, a triaxial gyroscope, and a triaxial geomagnetic sensor.

16. The hoist support system of claim 13, wherein the rail assembly comprises a rack coupled to and extending along the rail, and the motor assembly comprises a pinion coupled to an output shaft of the motor, the pinion mated with the rack such that actuation of the motor causes rotation of the pinion and translation of the motor assembly along the rack.

17. The hoist support system of claim 13, wherein the truss structure includes at least one adjustable member including a mounting feature of the plurality of mounting features, the adjustable member adapted to adjustably extend from the truss structure.

18. The hoist support system of claim 13, wherein each of the plurality of rail tabs includes a boss projecting from the rail tab and the channel includes a plurality of indentations shaped to receive the bosses of the plurality of rail tabs.

19. The hoist support system of claim 13 further comprising a hoist coupled to the motor assembly.

* * * * *